United States Patent
Cooper-Ratliff et al.

[11] Patent Number: 5,806,469
[45] Date of Patent: Sep. 15, 1998

[54] BREAKAWAY LOOP FOR LARIATS

[76] Inventors: Betty Gayle Cooper-Ratliff, P.O. Box 826, Durant, Okla. 74702; Jake Merrick, Rt. 1, Box 242, Paducah, Tex. 79248

[21] Appl. No.: 591,777

[22] Filed: Jan. 25, 1996

[51] Int. Cl.⁶ .................................................. A01K 15/04
[52] U.S. Cl. .......................... 119/805; 119/772; 119/774; 119/865; 119/792
[58] Field of Search ..................... 119/772, 774, 119/792, 793, 865, 805; 294/74, 82.14, 99.1, 82.24; 24/3.4, 131 C, 597

[56] References Cited

U.S. PATENT DOCUMENTS

| 1,702,596 | 2/1929 | Crockett | 119/772 |
|---|---|---|---|
| 3,530,547 | 9/1970 | Robinson | 119/865 |
| 3,584,606 | 6/1971 | Reidhead | 119/805 |
| 4,928,634 | 5/1990 | Voigt | 119/805 |
| 5,443,039 | 8/1995 | Suchowski | 119/865 |

FOREIGN PATENT DOCUMENTS 101057  9/1925  Austria ................................. 119/772

Primary Examiner—John G. Weiss
Assistant Examiner—Bruce E. Snow
Attorney, Agent, or Firm—Jerry C. Ray

[57] ABSTRACT

A releasable honda for lariat ropes has a heel with a throat through which the rope passes, with a tapered throat end forming a cavity for containing a knot in the rope; teeth and/or ridged projections inside the throat retain the rope in position. An axis of the throat is at an angle to a centerline through the heel. Resilient arms extend from the heel at angle to the centerline axis of the heel, and curve toward each other so that the distal ends of the arms almost meet, defining a slit between the arms. Tapered surfaces on the end of each resilient arm cooperate to form a shallow V-shaped indentation on an inner surface of the eye to guide rope into the slit so that a strong pull will force the rope through the slit, releasing the loop; a similar indentation on the outer perimeter of the eye facilitates slipping the rope back into the eye to reform a lasso.

8 Claims, 4 Drawing Sheets

( VIEW 1-1 )

( VIEW 2-2 )

BREAKAWAY LOOP FOR LARIATS

CROSS REFERENCE TO RELATED APPLICATIONS

None

BACKGROUND OF THE INVENTION

1. Field of the Invention

This invention relates to hondas for lariat ropes, and especially to hondas which have a breakaway or release feature for use during practice roping.

2. Description of the Related Art

A lasso or lariat is a rope with a running noose used to catch and hold animals such as cattle and other livestock. A large eye, called a honda, in one end of the rope receives the other end to form a running noose or loop.

Roping calves and larger animals is often practiced as a sport; calf-roping is a major event at rodeos. Both working cowboys and rodeo cowboys need to practice roping to sharpen their respective skills.

Practicing with a lasso made with a regular honda means that each time a roper catches an animal, he has to get off his horse and remove the rope from the animal's neck. This of course takes time and cuts down on the number of practice throws a cowboy can make in a given time. In addition, there is some chance of injury to animals being used for practice, because the calves are generally roped while running. After the lasso is thrown over a calf's head, the roper's horse stops and braces itself, so that when the calf hits the end of the rope it is brought to a very abrupt halt.

Another problem is that a honda tied in a rope imparts a "feel" to the lasso, depending on whether the knot is tied with a right-handed or left-handed orientation. Left-handed ropers tie a honda with the knot on the left side; right-handed throwers prefer a knot tied on the right side of the honda. Some ropes are made with a left-hand twist so that the lay of the strands is opposite that of regular ropes. The left-handed lay allows left-handed ropers to tie a honda which feels to them the same as a right-handed honda feels to a right-handed roper. In competition roping, the difference is enough to be significant.

SUMMARY OF THE INVENTION

The present invention is a solution to the problems described above; it is a releasable or breakaway honda which will hold the rope while the lasso is being thrown, but will release against a strong pull so that the lasso is released when a calf hits the end of the rope. Releasing the rope is accomplished by forming an eye from two resilient arms which extend from the body of the honda, called the "heel". The arms have a compound curvature to form an eye, but the eye is not completely closed as the tips of the arms define a slit between them—the slit is in the end of the eye opposite the heel. The arms will pull apart sufficiently to allow a rope to pass through the slit, and then spring back into position, re-forming the eye. Also, the honda described herein has the same "feel" to right-handed and left-handed throwers.

Two features help keep the running part of the rope in the end of the eye near the slit. First is the angle of the opening or throat in the heel of the honda relative to the tips of the arm. This angle causes a pull on the rope to exert an off-center force on the honda, so the eye portion of the honda tends to rotate the arms of the honda towards a perpendicular orientation relative to the rope running through the honda. In addition, the arms of the honda are curved so that in side view they have the shape of a shallow "C," and the eye narrows toward the end having the slit. Thus the orientation of the honda to the running part of the rope is such that the rope runs freely through the honda and improves performance; also the rope stays near the slit so that stress on the arms is reduced when the rope is pulled through the slit.

After the rope has pulled out of the honda through the slit, i.e., when the roped animal hits the end of the lariat, the lasso is easily remade by pushing the rope back into the eye through the slit. Notches or depressions on inner and outer surfaces of the eye, adjacent the slit, guide the rope into the slit to facilitate both the release of the lasso and re-forming the lasso after its release.

Based on the above, it is an object of this invention to provide a breakaway honda useful for roping practice.

It is a further object to provide a breakaway honda which will facilitate practice roping while lessening the danger of injury to animals.

Another object is to provide a honda which will release against a strong pull on the rope, while allowing a loop to be made again easily and quickly after the release.

Another object is to provide a honda having the same size and weight as a tied honda, but with improved performance and ease of use.

Further objects are to achieve the above with a device that is sturdy, compact, durable, lightweight, simple, safe, efficient, reliable, yet inexpensive and easy to manufacture.

The specific nature of the invention, as well as other objects, uses, and advantages thereof, will clearly appear from the following description and from the accompanying drawings, the different views of which are not necessarily scale drawings.

CATALOG OF THE ELEMENTS

Figure 1:
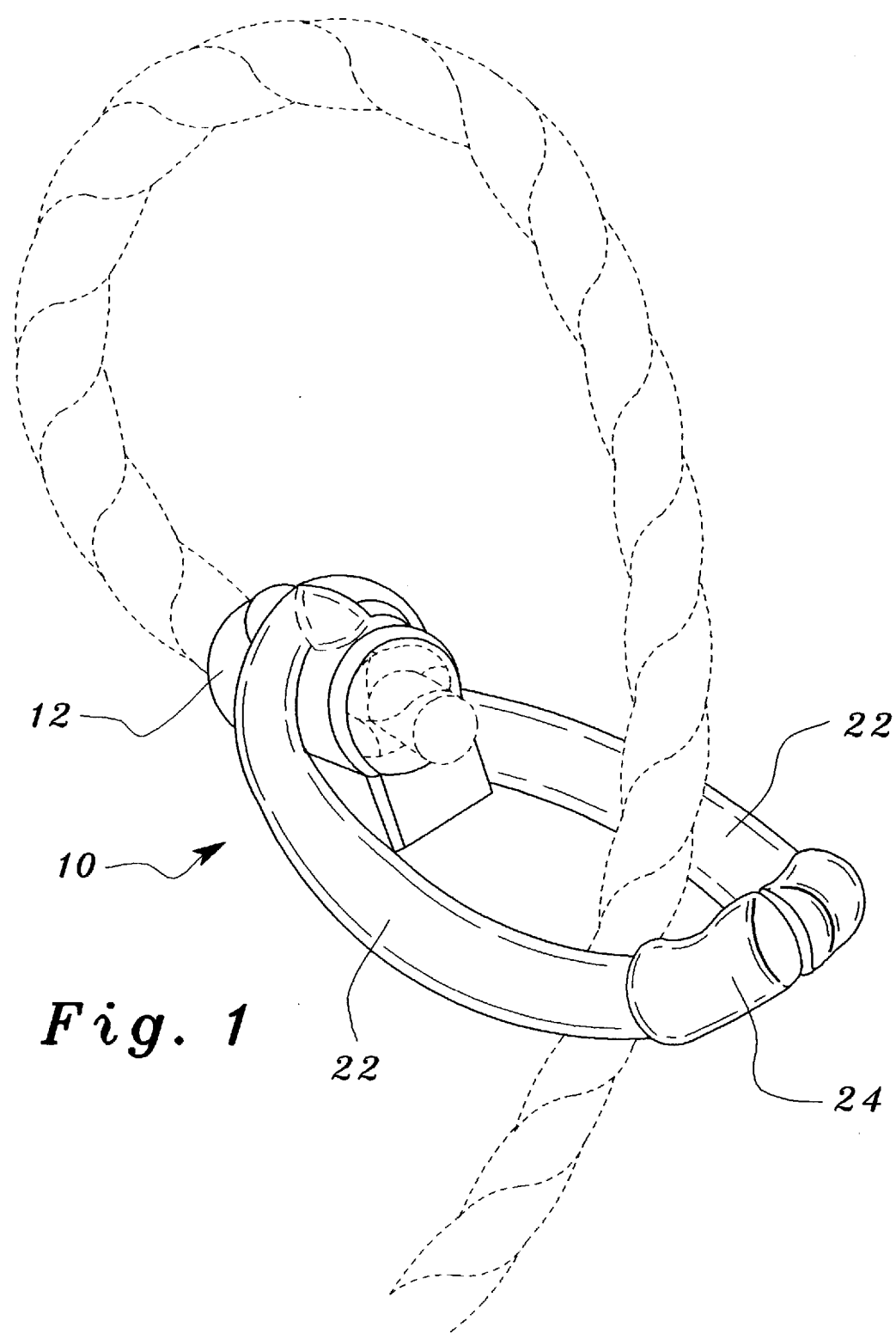
FIG. 1 is a perspective of a breakaway honda with a rope attached to form a lasso.

To aid in the correlation of the elements of the invention to the exemplary drawings, the following catalog of the elements is provided:

10 honda
12 heel
14 heel throat
20 eye
22 arm
24 arm tip
26 slit
30 tapered surface
32 indentation

DESCRIPTION OF THE PREFERRED EMBODIMENTS

Referring to the drawings, FIG. 1 shows an eye or honda 10 for attaching to the end of a rope. A lasso made with the honda is releasable, for use in practice roping. Many ropes used for roping, especially in competition, are 10.5 mm in diameter; the honda may be made in varying sizes to fit other diameters of rope. Made by injection molding of a strong, resilient plastic, the honda described herein is the same size as a honda tied in a rope, about 1⅝" wide and 4⅝" long. Also the practice honda weighs the same as a tied honda, which for 10.5 mm rope is about 1.5 oz. One plastic suitable for the breakaway honda is sold under the trade name "Super-Tough Nylon."

Figure 2:
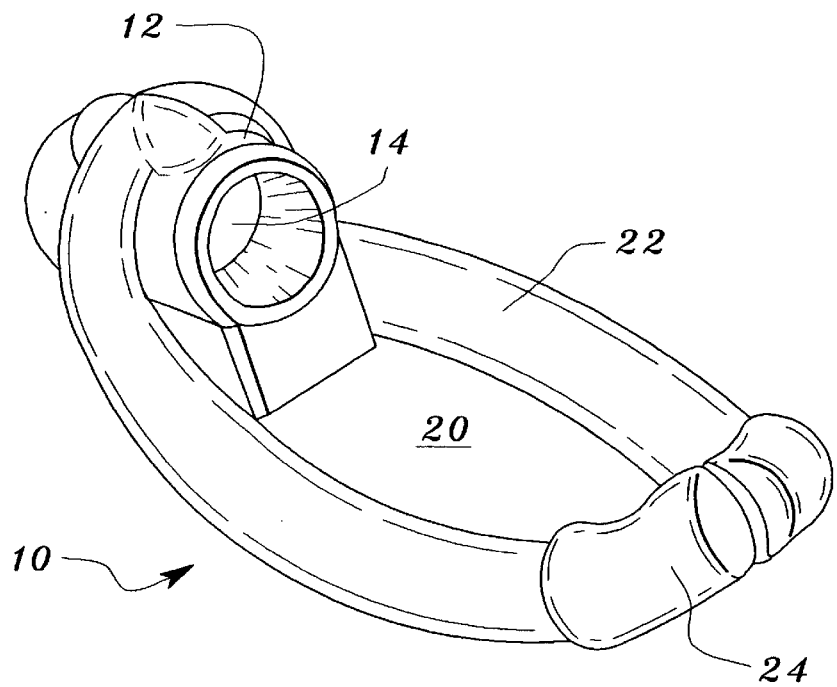
FIG. 2 is a top right perspective of a breakaway honda.

Referring to FIG. 1 and FIG. 2, the honda 10 is attached to a rope by first inserting a rope end through a throat 14 in the body of the honda; the body of the honda is herein referred to as a heel 12. An end of the throat 14 nearest the eye 20 flares outward, to form a funnel-shaped cavity for containing a knot in the rope as shown in FIG. 1; the throat becomes cylindrical towards the end away from the eye. A knot is tied in the rope end, and the rope is pulled back through the heel 12 until the knot seats in the tapered throat 14 of the heel. The distal end of the throat 14, away from the eye, is of sufficiently large diameter to receive the rope but too small to allow the knot to pass through. It is contemplated that the throat will have a diameter of up to 11 mm, and can be made larger or smaller to accommodate different rope diameters. To form a lasso, the running part of the rope is inserted into the honda as described below.

As described above, the feel of the honda to a roper is very important, so preventing any lateral movement of the honda relative to the rope is necessary. Means for gripping the rope are provided to keep the rope in place in the throat, so the honda does not roll or turn on the rope. The rope may be gripped by elongate ridges (16) which are molded into the inner surface of the throat 14; the ridges have sharp crests which are aligned with the axis of the throat to engage the surface of the rope. The effect of the ridges is to give the interior surface of the throat a serrated surface. The ridges may be located only on the funnel-shaped portion of the throat, or on the entire inner surface of the throat. To prevent the honda from slipping lengthwise on the rope, at least one other tooth (18) or projection extends from the funnel end of the throat toward the axis. This tooth or teeth engages the knot to retain it in place in the funnel opening. Together, the ridges (16) and the projecting teeth (18) prevent any movement of the honda relative to the rope so that it stays firmly in place and has the feel of a tied honda.

Eye 20 of the honda 10 is formed by two resilient curved arms 22 which extend from either side of the heel. Each arm has a compound curvature, and each arm is a mirror image of the other arm. As shown in FIG. 2, the arms 22 extend from the heel 12 at an angle to the heel. The arms are curved so that the angle of the arms relative to the axis of the heel throat 14 decreases away from the heel. The result is that in side view (FIG. 4), the curvature of the arms is in the shape of a shallow "C," with the distal ends of the arms 22 curving back toward the axis of the heel throat.

Properly releasing the rope requires that the running part of the rope remain near the slit end of the honda. This is accomplished in part by the "C" shape of the arms described above. In cooperation with the shape of the arms, the throat in the heel is at an angle to a line between the center of the throat and the tips of the arms. That is, with the convex side of the eye facing up, a linear axis of the cylindrical end of the throat is angled relative to a line joining the throat and the tips between 5° and 25°. The preferred angle is about 15°. This angle improves the performance of the releasable honda because tension on the rope exerts a force on the heel which tends to rotate the eye toward its convex side, so that the eye is more nearly perpendicular to the running part of the rope. This orientation of the C-shaped honda to the running part of the rope ensures that the rope feeds through the opening in the honda more easily, thus improving performance.

Figure 3:
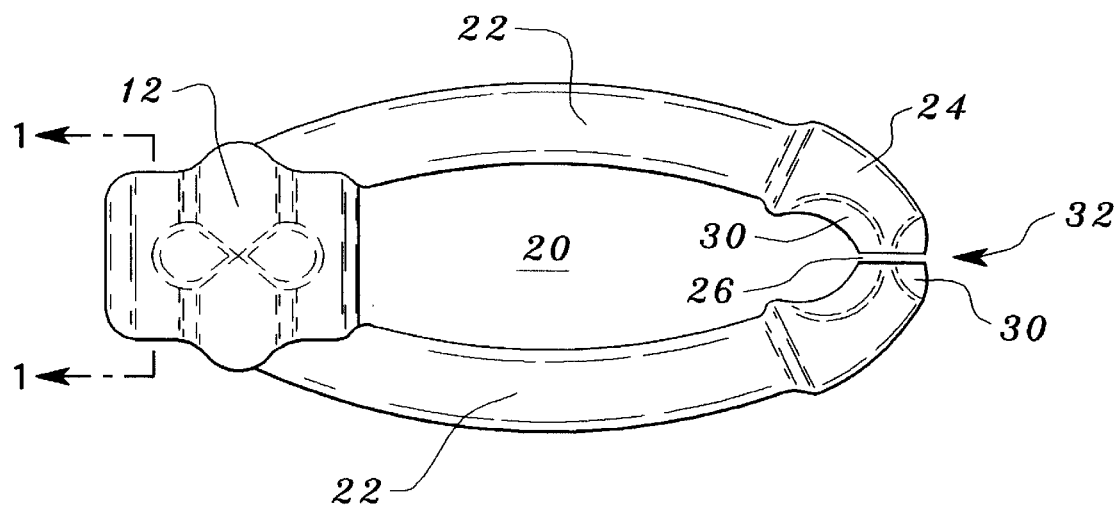
FIG. 3 is a top plan view showing the slit between tips of the arms.
Figure 5:
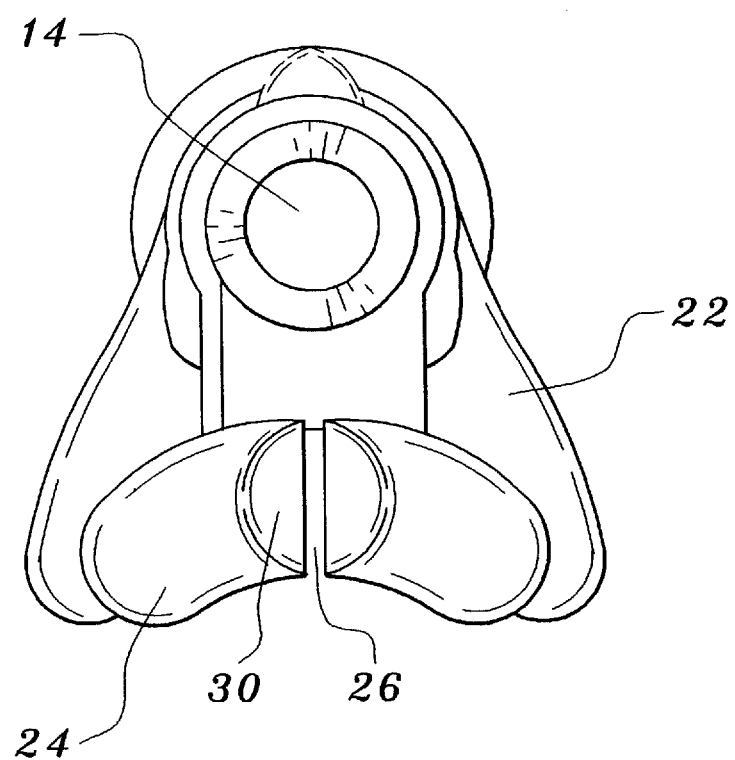
FIG. 5 is a front elevation showing the heel throat and the slit between tips of the arms.
Figure 6:
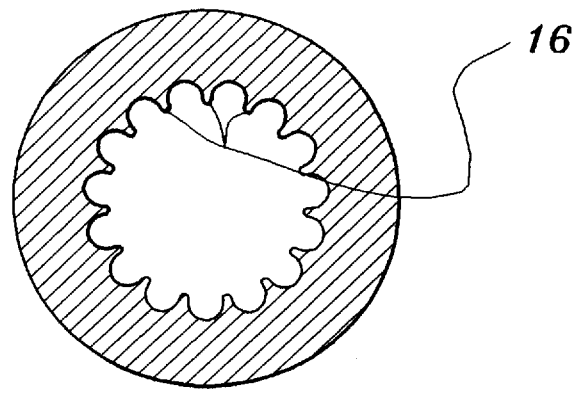
FIG. 6 is cross section on view 1—1 of FIG. 3.
Figure 7:
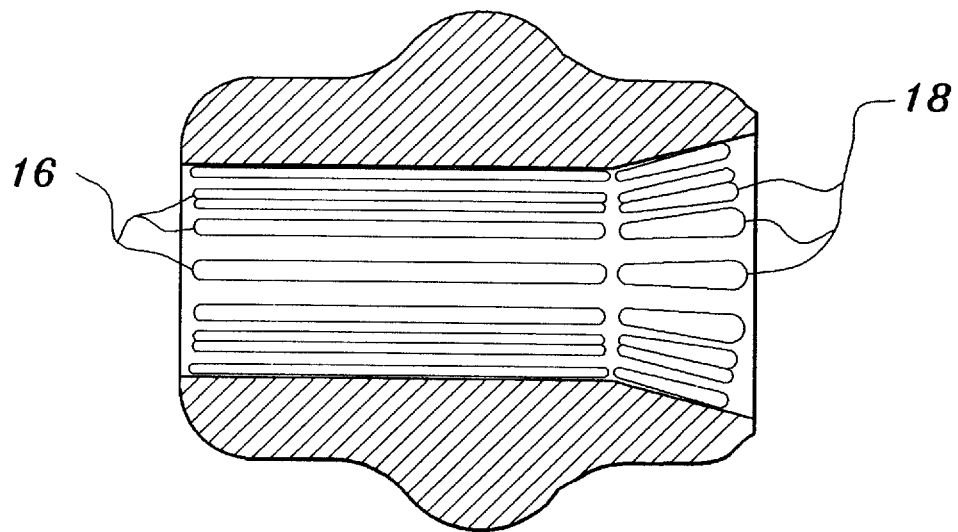
FIG. 7 is a cross section on view 2—2 of FIG. 4.

Referring to FIG. 3, the arms 22 diverge from each other as they extend from the heel 12. The arms are recurved, that is the curvature of the arms relative to each other changes from divergent to convergent toward the tips of the arms, so that the distal ends of the arms converge toward each other to form an eye. The ends or tips 24 of the arms do not meet, but define a narrow slit 26 between the tips as shown in FIG. 3 and FIG. 5. Under sufficient pressure from the rope, the arms are forced apart and the slit 26 widens to allow the rope to pass through the slit, releasing the lasso. The honda, including the arms, is made from a strong resilient plastic so that the arms 22 spring back into position after being forced apart as the rope pulls through the slit.

Figure 4:
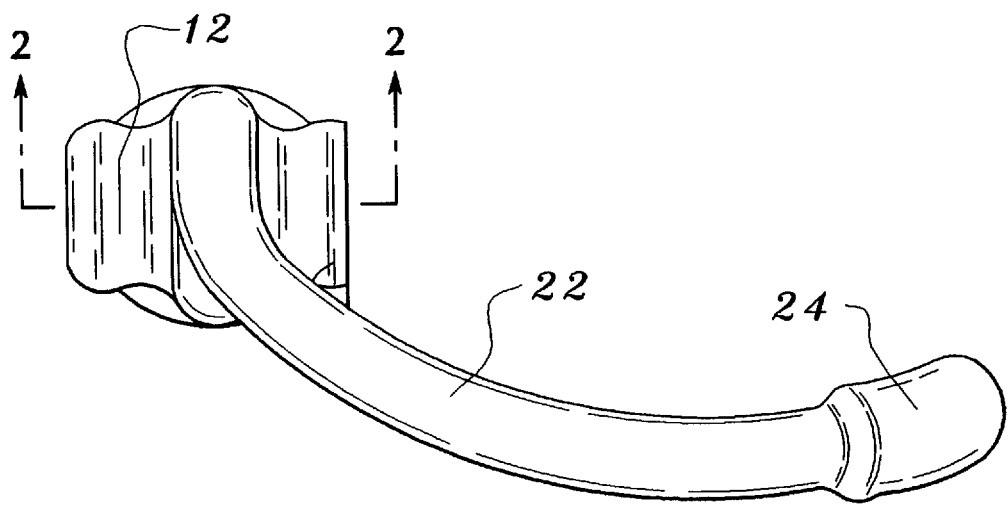
FIG. 4 is a side elevation showing the curvature of the arms.

The distal ends or tips 26 of each arm 22 terminate in a thickened section, as shown in FIG. 2, FIG. 3 and FIG. 4. In addition to strengthening and reinforcing the arm tips, the added weight of the thickened section moves the honda's center of gravity toward that end, improving the balance of the honda. Another function of the thickened tips is to act as a "rope burner," which is a surface to withstand the abrasion caused by a rope running through the eye.

Each tip 24 has tapered surfaces 30 on its extremity, so that two tapered surfaces cooperate to form a notch or indentation 32 where the ends meet. The angle of the taper is such that the indentation 32 receives a 10.5 mm diameter rope. The indentation serves as a guide for the rope, both when it is pulled from the honda and when it is reinserted. In one embodiment, one notch or indentation 32 is on the inner surface of the eye 20; another is on the outer perimeter of the eye, as shown in FIG. 3. Alternatively, the end of each tip 26 is radiused its circumference, forming a continuous bevel around each tip adjacent the slit. The radiused ends cooperate to form a shallow groove or depression around the circumference of the slit to guide the rope into the slit.

Breakage of the curved arms is reduced or eliminated because the curvature of the honda tends to keep the rope toward the distal end of the arms, and the indentation at that end of the eye guides the rope into the slit 26 between the arms 22. A strong pull on the rope causes the arms to spring apart sufficiently for the rope to slip through the slit 26 between the tips of the arms, thus breaking the noose of the lasso.

The noose is remade simply by pressing the running part of the rope against the indentation 32 in the outer perimeter of the eye; the arms spring apart under pressure from the rope and then close after the rope slips inside. The lasso is quickly ready for another practice run.

The embodiments shown and described above are only exemplary. Various modifications can be made in the construction, material, arrangement, and operation, and still be within the scope of our invention. The restrictive description and drawing of the specific examples above do not point out what an infringement of this patent would be, but are to enable one skilled in the art to make and use the invention. The limits of the invention and the bounds of the patent protection are measured by and defined in the following claims.

We claim as our invention:

1. A releasable honda for lariat ropes, comprising:
   a heel having a throat for receiving an end of a rope,
   two resilient curved arms extending from said heel at an angle to an axis of said throat, said arms having a compound curvature so that a tip of each arm is proximate a tip of the other arm to form an eye, said tips of said arms defining a slit therebetween, said tip of each arm having at least one tapered surface, and an end of said throat adjacent said eye being tapered to form an opening for receiving a knot therein.

2. The releasable honda as described in claim 1, further comprising:

means for gripping a rope including at least one tooth projecting from said throat toward an axis of said throat.

3. The releasable honda as described in claim 1, wherein:

said means for gripping a rope include ridges extending from an inner surface of said throat.

4. The releasable honda as described in claim 3, wherein:

said ridges are parallel to a linear axis of said throat.

5. The releasable honda as described in claim 1, wherein:

an axis of said throat is at an angle between 5 degrees and 25 degrees relative to a centerline of said heel.

6. The releasable honda as described in claim 5, wherein:

said angle is about 15 degrees.

7. The releasable honda as described in claim 1, wherein:

said tapered surfaces cooperate to form an indentation for guiding the rope into said slit.

8. The releasable honda as described in claim 7, further comprising:

an indentation on an outer perimeter of said eye for guiding the rope into said slit, and an indentation on an inner surface of said eye for guiding the rope out of said slit.

* * * * *